April 16, 1946.　　　O. SCHULZ　　　2,398,724
EDUCATIONAL APPLIANCE
Filed July 3, 1944　　　3 Sheets-Sheet 1
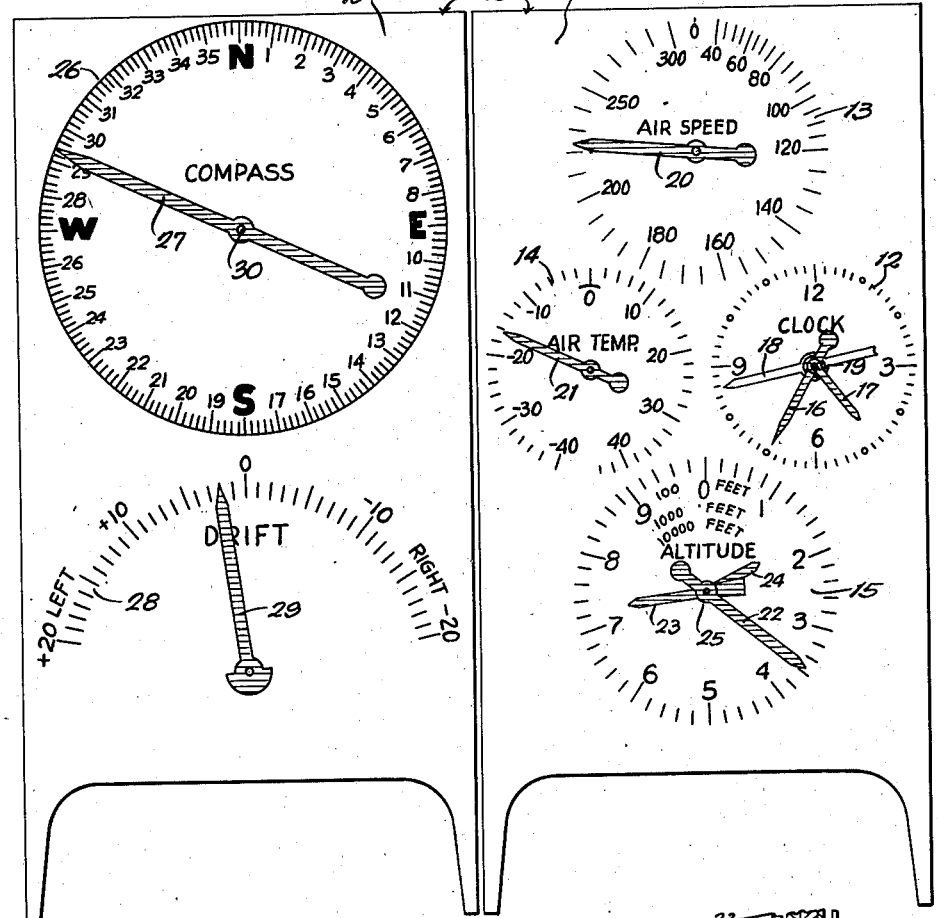
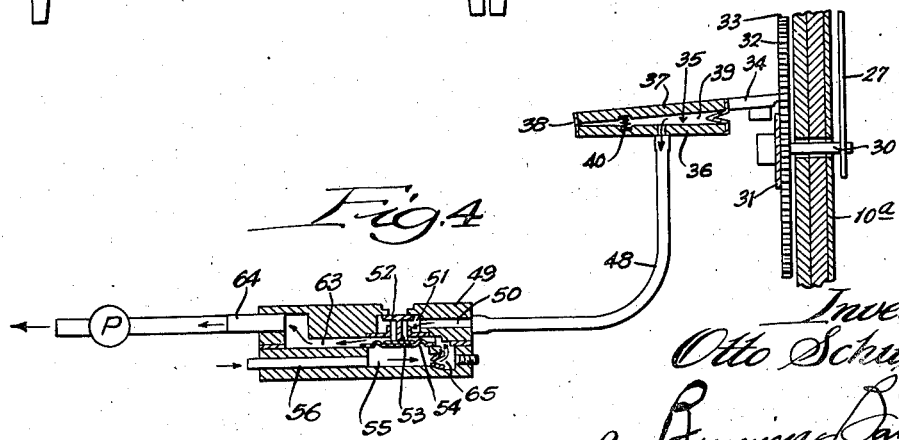

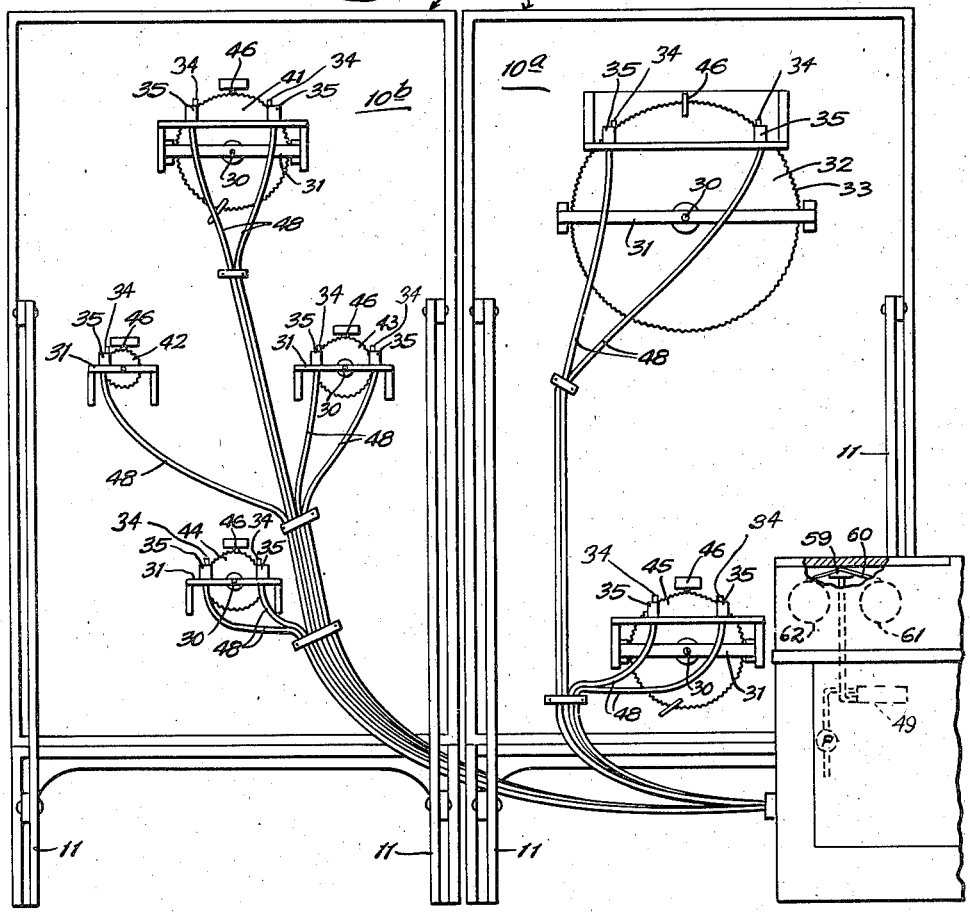
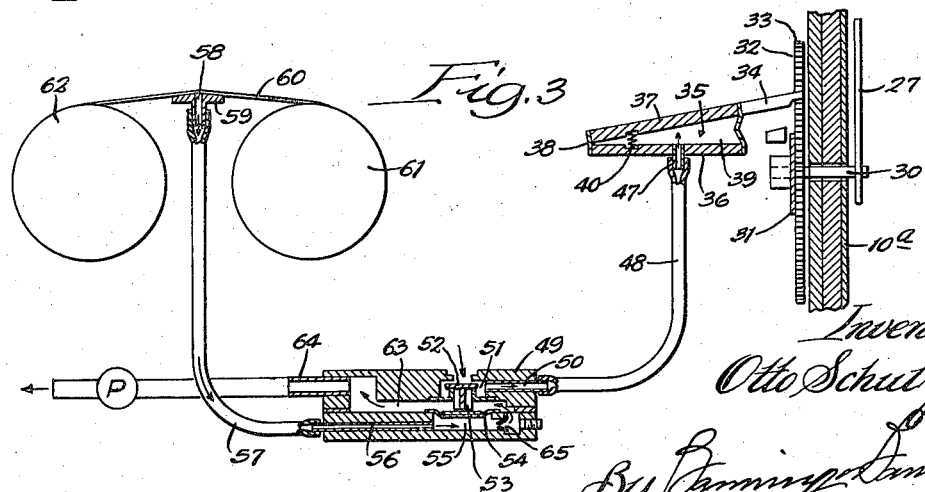

April 16, 1946. O. SCHULZ 2,398,724

EDUCATIONAL APPLIANCE

Filed July 3, 1944 3 Sheets-Sheet 3

Fig. 5

Inventor:
Otto Schulz,
By Banning Banning
Attorneys.

Patented Apr. 16, 1946

2,398,724

UNITED STATES PATENT OFFICE 2,398,724

EDUCATIONAL APPLIANCE

Otto Schulz, Evanston, Ill., assignor to American Automatic Typewriter Company, Chicago, Ill., a corporation of Illinois Application July 3, 1944, Serial No. 543,283

9 Claims. (Cl. 35—12)

The present invention, in the form shown, is directed to a panel of sufficiently large size to be easily visible to a number of students assembled for instruction in aeroplane flying, although the device might be employed in other fields of activity.

The panel in the form shown is intended to simulate the panel board of an aeroplane and for this purpose is provided with a number of dial face markings with rotatable pointers which simulate the dial faces on the panel board of an aeroplane. The purpose of the invention is to simulate dial face readings of an aeroplane in flight and thereby accustom the students to the conditions encountered in actual service. In the form shown the panel board is provided with a group of dial faces which indicate time, speed, temperature, altitude, compass direction, and drift, but it will be understood that other indications might be provided for if desired. The invention in its entirety includes a control cabinet which is of substantially the pneumatic type employed in piano players, automatic typewriters, or the like, and of a nature fully understood in the art of pneumatic control of such instrumentalities. A cabinet of this type employs a tracker bar over which runs a record strip having perforations therein which conform to the running log of an aeroplane flight. As the strip is fed forward over the tracker bar, the perforations in proper sequence will register with apertures in the tracker bar thereby effecting pneumatic impulses which conform in frequency and in position to the flight record and actuate the present mechanism in the proper direction to visually indicate variations in altitude, speed, etc. It is not deemed necessary to describe in detail the construction of the control cabinet save in respect to those parts which directly impart the pneumatic impulses to the present mechanism. The hands or pointers are rotated step by step in the proper direction by the pneumatic impulses so that as the record strip is wound off from the roll, every detail of a typical recorded flight will be reflected on the dial faces in simulation of corresponding occurrences in an actual aeroplane flight. In this way, the students will be taught to observe the variations in altitude with accompanying variations in temperature, wind drift, and compass deflection and like corresponding factors which must be observed and correlated in actual service. Further objects and details will appear from a description of the invention in conjunction with the accompanying drawings; wherein Figure 1 is a front elevation of a panel composed of two sections for convenience in handling and storage;

Fig. 2 a reverse view of the same with a portion of the control cabinet and pneumatic connections leading therefrom;

Figs. 3 and 4 are details in section of the valves and tracker bar of the cabinet and the bellows for stepping off the movements imparted to the rotatable hands or pointers; and Fig. 5 is a view of a section of the chart upon which the flight is represented as a guide for the perforating of the record.

As shown, for purposes of illustration, the panel 10 consists of two sections 10a and 10b each of which is individually supported, when in erected position by suitable easel supports 11 of conventional type. The panel sections when erected and brought into close edgewise relation to one another, present a widely extended surface easily visible from a considerable distance for the accomodation of a large group of students. The panel section 10b, as shown, provides surface for the inscription thereon of typical dial faces, 12, 13, 14, and 15 which respectively represent time, air speed, air temperature and altitude.

The time dial face 12 is in all respects a clock having the conventional hour markings from 12 through 3-6 and 9 back to 12 with intermediate markings indicating the intervening hours and fractions thereof. The time dial face clock is provided with a minute hand 16, an hour hand 17 and a second hand 18 which is power actuated and which imparts progressively reduced movements to the minute hand and second hand through the means of gearing enclosed within a gear casing 19 to give the proper speed relation between the hands. The clock hands are necessarily rotated in the forward or clockwise direction only since the progress of time is an irreversible factor.

The speed dial face 13 is provided with a ring of gauge markings representing variations in the speed scale on the basis of 20 M. P. H. which markings are progressively increased in spacing per unit of distance as the higher speeds are attained in conformity with accepted practice. The speed dial face is provided with a single hand or pointer 20 which is advanced or retracted to indicate acceleration or deceleration in speed.

The temperature dial face 14 is provided with a ring of markings indicating temperatures varying from zero to plus or minus 40. The temperature readings are indicated by a pointer 21 which is adapted for movement in either the forward or reverse direction.

The altitude dial face 15 is divided into numbered spaces from 1 to 9 with intervening fractional spaces, and the pointers or hands are three in number as in the case of the clock. The pointer 22 is a power driven pointer which indicates altitude in units of 100 feet or fractions thereof while the pointers 23 and 24 are intended respectively to indicate altitude in units of 1000 feet and 10,000 feet, being geared to the pointer 22, the means of gearing enclosed within a gear box 25.

The companion panel section has inscribed thereon a compass dial face 26 in the form of a ring of markings with the major inscriptions North, East, South and West and with intervening numbered spaces indicating fractional divisions between North and East, East and South, South and West and West and North. The compass dial face is provided with a pointer 27 which can be moved in the forward or reverse direction to indicate variations in the compass course of an aeroplane.

The wind drift is indicated by a semicircular dial face 28 with markings running from the center mark 0 to minus or plus 20 indicating wind drift to the right or to the left and the amount of the drift is indicated by a pointer 29 movable in the forward or reverse directions.

The feed mechanism for the various pointers is in all cases substantially identical so that a description of one of such devices will suffice for all. For purposes of description, we may consider the mechanism shown at the upper right of Fig. 2 which is the mechanism for controlling the compass pointer. The pointer is carried by a spindle 30 which is suitably journalled at its rear end through a bridge bar 31 secured to the rear face of the panel section. The spindle has frictionally mounted thereon a ratchet-wheel 32, the frictional contact with the spindle being sufficient to impart rotation while at the same time permitting the hand to be set while the ratchet-wheel remains stationary. The rim of the ratchet-wheel is provided with teeth 33 which correspond in number to the subdivisions of the compass dial face so that one step movement of the ratchet wheel will impart a single step movement to the compass pointer. The movements in the forward and reverse directions are imparted by a pair of spaced dogs 34 each of which extends inwardly from a bellows 35 consisting of a fixed base section 36, a movable top section 37 connected by a hinge 38 with the base and a bellows folded wall 39. The bellows is normally held in an open or distended position by an interposition of a light spring 40, but the parts are so disposed that when the air is exhausted from the bellows, the hinged upper section will be drawn downwardly thereby imparting a step movement to the dog of sufficient amplitude to move the ratchet-wheel to the desired extent which will ordinarily be one step for each tooth on the ratchet-wheel.

The remaining ratchet-wheels are similarly constructed and differ from that described only in size so that a detailed description is unnecessary. The remaining ratchet-wheels are designated as follows; air speed ratchet-wheel 41, clock ratchet-wheel 42, temperature ratchet-wheel 43, altitude ratchet-wheel 44, and drift ratchet-wheel 45. All of the ratchet-wheels are pneumatically actuated in the manner described with the exception of the clock ratchet-wheel 42 which is actuated by a single dog since no reverse movement is required. In order to prevent any overrunning of the ratchet-wheels, each is provided with a lightly contacting friction brake 46, and it will, of course, be understood that the teeth in each of the ratchet-wheels are properly spaced, and the degree of movement imparted by the bellows is properly computed to give the intended degree of step by step advancement to the hands or pointers.

Save for the employment of a dog for engagement with a ratchet wheel, the construction of the bellows is substantially identical with that employed where the control cabinet is employed in connection with a piano player or automatic typewriter, and the parts now to be described are of standard construction in control cabinets of this character. Each of the bellows is provided in its floor with a nipple 47 which furnishes a connection for a flexible tube 48 leading down to a valve block 49 in the control cabinet. The lower end of the tube is fitted on to a nipple 50 which affords a passage to an air intake chamber 51 controlled by a disk valve 52 having a stem 53, the lower end of which is adapted to contact a diaphragm 54. Beneath the diaphragm is a vacuum chamber 55 which has entered thereinto a conduit 56 to which is attached a tube 57 leading up to a single one of the numerous apertures 58 in a tracker bar 59 over which the record strip 60 is fed from a delivery roll 61 to a take up roll 62.

Above the diaphragm 54 is a passage 63 connecting with the conduit 64 leading to a pump or other suitable mechanism for exhausting air and establishing vacuum conditions. Passage 63 communicates with the vacuum chamber 55 through a minute bleed nipple 65. These features are so related that when an imperforate portion of a record strip overlies a given aperture in the tracker bar, the exhausting of air, through the conduit 64 and passage 63 and vacuum nipple 65, will establish vacuum conditions beneath the diaphragm thereby lowering the valve 52 and permitting air to flow from atmosphere into the bellows. When, however, a perforation in the record strip registers with the aperture in the tracker bar, air will be admitted in sufficient volume to break the vacuum beneath the diaphragm thereby allowing the latter to rise which elevates the valve 52 to seal the passages against the inflow of atmospheric air so that suction through the passage 63, chamber 51, nipple 50, and tube 48 will exhaust air from the bellows and momentarily actuate it against the tension of the spring 40 thereby moving the ratchet-wheel one tooth or any other predetermined amount.

Of course, it will be understood that the particular valve mechanism last described serves merely for purposes of illustration.

*Operation*

The record strip is perforated in conformity with the subdivisions of the vertical columns on the chart of Fig. 5 in which each vertical column represents 1 minute of time according to the 24 hour system with cross markings indicating fractional periods of 5 seconds. The dots on the chart indicate the position of the perforations to be cut in the record strip which, of course, must properly align with the apertures in the tracker bar, so that the computed conditions and directional movements will be accurately indicated when the record strip is advanced at a speed conformable to the time schedule.

After the record strip in roll form has been properly inserted within the control cabinet, the various pointers are moved to the respective positions indicative of a typical set of conditions existing at the beginning of a record flight. Thus, the clock is moved to indicate the starting time and the altitude, compass, speed, recorded temperature and the drift are all set to the intended readings. This setting of the hands or pointers is easily accomplished by reason of the fact that the hands move freely under a light impulse without moving the ratchet-wheels with which they are frictionally associated. After the initial setting of the various pointers has been made, the record strip is advanced to the starting position and thereafter will be moved uniformly at a predetermined rate which may, if desired, correspond exactly with actual clock time or with some other predetermined time scale.

The clock hands will be stepped off in the conventional manner in the clockwise direction so that at all times during the simulated flight, the time factor will be accurately indicated. As the record strip advances and the perforations of the different rows pass in succession over the tracker bar, impulses either in the forward or reverse direction will be pneumatically imparted to the operating dogs, and the respective ratchet-wheels will be stepped off the intended number of notches in the intended direction thereby simulating the indications given by the actual dial faces on the dial board of an aeroplane in flight. If desired, at any point the progress of the record strip may be halted for purposes of explanation or otherwise, and time taken out, as it were, before the flight record is resumed. In this way the students will become accustomed to the visual indications given by the dial faces of an aeroplane and will become accustomed to the coordination of data indicated.

Although for present purposes, the appliance has been designed to indicate varying conditions in an aeroplane flight, it is obvious that if desired, the appliance might be employed for other educational purposes in which it is desirable or necessary to coordinate variable factors in order to familiarize students with actual operating conditions so that it will be understood that it is not intended to limit the claims to the imparting of data of any particular character, nor is it the intention to limit the operation of the device to pneumatically controlled mechanisms responsive to perforations in a record strip.

I claim:

1. In an educational appliance of the class described, the combination of a panel having applied thereon a plurality of dial faces each graduated by a progression of units of measurement indicative of the quantitative value of a factor conditioning the subject being taught, each of the dial faces having indicating means associated with the dial face graduations and changeable in position with respect thereto to visibly indicate degrees of change in the conditions represented by said graduations, a record member having a pattern of actuating points positioned in a time sequence correlated with progressive changes in the factors represented by the respective dial faces, connections and devices responsive to such actuating points and adapted to impart to the respective indicating means changes in indicated values in forward and reverse amounts commensurate with the magnitude and direction of changes in the factors indicated by such graduations, the changes in value of each indicating means being independent of the changes or direction of changes of the other indicating means but the changes of all indicating means being controlled in accordance with the operation of the record member, and means for effecting a progression in the response of such connections and devices in conformity with the pattern.

2. In an educational appliance of the class described, the combination of a panel having applied thereon a plurality of dial faces each graduated by a curving row of units of measurement indicative of the quantitative value of a factor conditioning the subject being taught, each of the dial faces having a pointer rotatable with respect to the dial face graduations to indicate degrees of change in the conditions represented by said graduations, a record member having rows of actuating points positioned in time sequence correlated with computed changes in the factors represented by the respective dial faces, connections and devices responsive to such actuating points and adapted to impart to the respective pointers degrees of forward or reverse movements commensurate with the magnitude and direction of such changes, the movements of each pointer being independent of the movements or direction of movements of the other pointers but the movements of all indicating pointers being controlled in accordance with the operation of the record member, and means for advancing the record member.

3. In an educational appliance of the class described, the combination of a panel having applied thereon a plurality of dial faces each graduated by a progression of units of measurement indicative of the quantitative value of a factor conditioning the subject being taught, each of the dial faces having a pointer movable with respect to the dial face graduations to indicate degrees of change in the conditions represented by said graduations, a record member having rows of actuating points positioned in time sequence correlated with computed changes in the factors represented by the respective dial faces, connections and devices responsive to such actuating points and adapted to impart to the respective pointers degrees of forward or reverse movements commensurate with the magnitude and direction of such changes, the movements of each pointer being independent of the movements or direction of movements of the other pointers but the movements of all indicating pointers being controlled in accordance with the operation of the record member, and means for advancing the record member, said dial faces including one representing a time progression and the pointer and connections and actuating points therefor progressing uniformly only in a forward direction.

4. In an educational appliance of the class described, the combination of a panel having applied thereon a plurality of dial faces each graduated by a curving row of units of measurement indicative of the quantitative value of a factor conditioning the subject being taught, each of the dial faces having a pointer rotatable with respect to the dial face graduations to indicate degrees of change in the conditions represented by said graduations, a record member having rows of actuating points positioned in time sequence correlated with computed changes in the factors represented by the respective dial faces, connections and devices responsive to such actuating points and adapted to impart to the respective pointers degrees of forward or reverse movements commensurate with the magnitude and direction of such changes, the movements of each pointer being independent of the movements or direction of movements of the other pointers but the movements of all indicating pointers being controlled in accordance with the operation of the record member, and means for advancing the record member, said dial faces including one representing a time progression and the pointer and connections and actuating points therefore progressing uniformly only in a forward direction.

5. In an educational appliance of the class described, the combination of a panel having applied thereon a plurality of dial faces each graduated by a progression of units of measurement indicative of the quantitative value of a factor conditioning the subject being taught, each of the dial faces having a pointer movable with respect to the dial face graduations to indicate degrees of change in the conditions represented by said graduations, a record member having rows of actuating perforations positioned in time sequence correlated with computed changes in the factors represented by the respective dial faces, pneumatic devices movable in response to said actuating perforations, a ratchet wheel and a pair of dog and ratchet assemblies cooperating with the ratchet wheel for each of the pointers subject to forward and reverse movements with respect to its dial face and movable by the related pneumatic devices for imparting forward or reverse movements to the pointer corresponding with the related perforations in the record member, the movements of each pointer being independent of the movements or direction of movements of the other pointers but the movements of all indicating pointers being controlled in accordance with the operation of the record member, and means for advancing the record member.

6. In an educational appliance of the class described, the combination of a panel having applied thereon a plurality of dial faces each graduated by a curving row of units of measurement indicative of the quantitative value of a factor conditioning the subject being taught, each of the dial faces having a pointer rotatable with respect to the dial face graduations to indicate degrees of change in the conditions represented by said graduations, a record member having rows of actuating perforations positioned in time sequence correlated with computed changes in the factors represented by the respective dial faces, pneumatic devices movable in response to said actuating perforations, a ratchet wheel and a pair of dog and ratchet assemblies cooperating with the ratchet wheel for each of the pointers subject to forward and reverse movements with respect to its dial face and movable by the related pneumatic devices for imparting movements to the pointer corresponding with the related perforations in the record member, the movements of each pointer being independent of the movements or direction of movements of the other pointers but the movements of all indicating pointers being controlled in accordance with the operation of the record member, and means for advancing the record member.

7. In an educational appliance of the class described, the combination of a panel having applied thereon a plurality of dial faces each graduated by a progression of units of measurement indicative of the quantitative value of a factor conditioning the subject being taught, each of the dial faces having a pointer movable with respect to the dial face graduations to indicate degrees of change in the conditions represented by said graduations, a record member having rows of actuating perforations positioned in time sequence correlated with computed changes in the factors represented by the respective dial faces, pneumatic devices movable in response to said actuating perforations, a ratchet wheel and a pair of dog and ratchet assemblies cooperating with the ratchet wheel for each of the pointers subject to forward and reverse movements with respect to its dial face and movable by the related pneumatic devices for imparting movements to the pointer corresponding with the related perforations in the record member, the movements of each pointer being independent of the movements or direction of movements of the other pointers but the movements of all indicating pointers being controlled in accordance with the operation of the record member, and means for advancing the record member, said dial faces including one representing time progression and the pointer and actuating means therefor progressing uniformly in the forward direction only, while the pointers for other of the dial faces together with the actuating means therefor are movable at variable intervals either in the forward or reverse direction.

8. In an educational appliance of the class described, the combination of a panel having applied thereon a plurality of dial faces each graduated by a curving row of units of measurement indicative of the quantitative value of a factor conditioning the subject being taught, each of the dial faces having a pointer rotatable with respect to the dial face graduations to indicate degrees of change in the conditions represented by said graduations, a record member having rows of actuating perforations positioned in time sequence correlated with computed changes in the factors represented by the respective dial faces, pneumatic devices movable in response to said actuating perforations, a ratchet wheel and a pair of dog and ratchet assemblies cooperating with the ratchet wheel for each of the pointers subject to forward and reverse movements with respect to its dial face and movable by the related pneumatic devices for imparting movements to the pointer corresponding with the related perforations in the record member, the movements of each pointer being independent of the movements or direction of movements of the other pointers but the movements of all indicating pointers being controlled in accordance with the operation of the record member, and means for advancing the record member, said dial faces including one representing time progression and the pointer and actuating means therefor progressing uniformly in the forward direction only, while the pointers for other of the dial faces together with the actuating means therefor are movable at variable intervals either in the forward or reverse direction.

9. An educational appliance in accordance with claim 8 wherein the indicating pointers for the various dials are yieldingly mounted on shafts with respect to their operating ratchet wheels whereby the pointers may be manually set with respect to the ratchet wheels and dials with which they are associated so that the various pointers may be moved to any desired position with respect to their associated dials to simulate a typical set of conditions existing at the beginning of an operation of the pointers thereafter by the record member.

OTTO SCHULZ.